(No Model.)
J. L. POPE.
WOOD WORKER'S CLAMP.
No. 248,949. Patented Nov. 1, 1881.
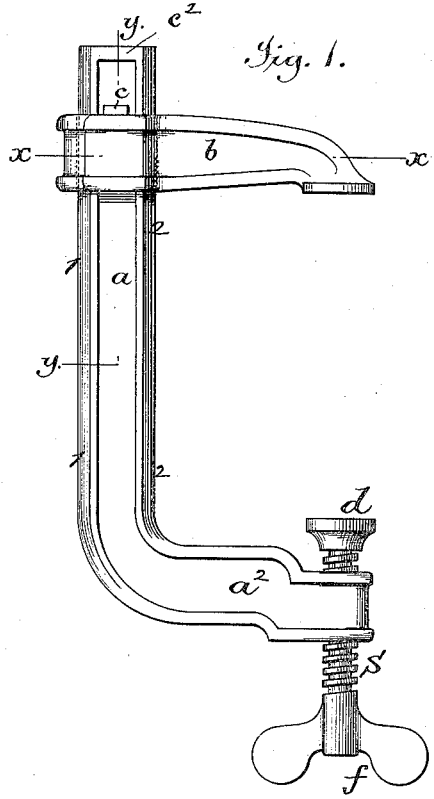
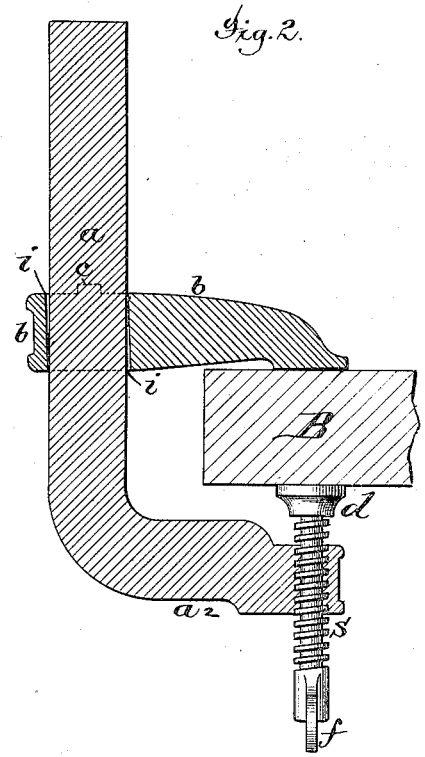
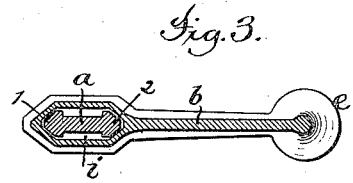
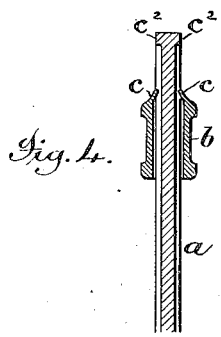
Attest;
G. M. Graham
Jacob Felbel
Inventor,
Jno. L. Pope
By
J. N. McIntire
Att'y.

UNITED STATES PATENT OFFICE.

JOHN L. POPE, OF CLEVELAND, OHIO, ASSIGNOR TO THE EBERHARD MANUFACTURING COMPANY, OF SAME PLACE.

WOOD-WORKER'S CLAMP.

SPECIFICATION forming part of Letters Patent No. 248,949, dated November 1, 1881.

Application filed August 1, 1881. (No model.)

*To all whom it may concern:*

Be it known that I, JOHN L. POPE, of Cleveland, in the county of Cuyahoga and State of Ohio, have invented certain new and useful Improvements in Clamps; and I do hereby declare that the following is a full and exact description thereof, reference being had to the accompanying drawings, making part of this application.

My invention relates to certain new and useful improvements in clamps such as used mostly by cabinet-makers, carpenters, and others for holding together glued or other work.

Previous to my invention clamps for such and other purposes have been made with a sliding jaw adapted to operate in opposition to the bearing end of a screw mounted in a nut formed in a fixed arm or laterally-projecting part of the clamp; but in all such contrivances with which I am familiar there have been some means for effecting the retention in place of the eye of the sliding jaw that rendered it necessary that the said jaw should be set at some given point of its travel in the bar, and that the screw of the clamp should then be turned in far enough to clamp the work between the bearing end of said screw and the bearing part of the sliding jaw.

My invention has for its main object to provide for use a clamp capable of a mode of operation such that the work may be placed in contact with the bearing end of the screw, the bearing part of the jaw then moved into contact with the opposite side of the work to be clamped, and the latter then securely confined by a very slight turning of the screw, the sliding jaw having the capacity to gripe and hold fast on the parallel bearing edges or sides of the body of the clamp, on which said jaw is free to move easily when in a state of disuse; and to this main end and object my invention consists, primarily, in the combination, with the body of the clamp formed with plain parallel opposite edges or sides, of a sliding jaw having a hole or eye for the accommodation of said clamp-body, which, though of about the same size at both ends, is so much larger than the clamp-body (widthwise of the latter) that when tipped out of parallelism with the latter the eye of the jaw will gripe the clamp-body by bearing against it at opposite sides of the body and opposite ends of the eye; all as will be hereinafter more fully explained.

My invention has for a further object to produce a clamp which, while it shall be efficient and convenient in operation, shall be simple and economic of manufacture; and to these ends further consists in certain peculiarities of construction hereinafter more fully explained, and particularly pointed out in the claims of this specification.

To enable those skilled in the art to make and use my invention, I will proceed to more fully describe the several features thereof, referring by letters to the accompanying drawings, in which—

Figure 1 is a side view or elevation, Fig. 2 a longitudinal central section, Fig. 3 a cross-section at the line $x\,x$ of Fig. 1, and Fig. 4 a longitudinal partial cross-section at the line $y\,y$ of Fig. 1, of a clamp made according to my said invention.

In the several figures the same part will be found designated by the same letter of reference.

$a$ is the body or bar of the clamp, and $a^2$ is the leg, which projects therefrom (at one end) about at right angles, for supporting or carrying the clamping-screw S, and which preferably is cast solid with the said body $a$, as shown. The clamping-screw S works in a nut formed in the end of the part $a^2$, and has a platen-like bearing enlargement, $d$, at one end, and a head, $f$, adapted to be turned by the thumb and finger at the other end, all about as usual.

$b$ is the sliding jaw, which is formed with a bearing or pad-like surface, $e$, at one end, adapted to act in opposition to the part $d$ of the screw in clamping a piece of work, as illustrated, for instance, at Fig. 2, where B represents the work held in the clamp. The other end of the sliding jaw $b$ is formed with an eye, $i$, adapted to permit the insertion within and passage through it endwise of the body or bar $a$ of the clamp. The cross-sectional shape of the eye $i$ and the bar $a$ will be best understood by reference to Fig. 3 of the drawings, from which it will be observed that the sort of V-shaped opposite edges 1 and 2 of said bar $a$ conform in shape (in cross-section) to the shape of the eye in the jaw $b$, though the bar $a$ is reduced in thickness at each of its other two (and broader) sides, so as not to ever come in contact with the sides of the eye $i$ of the jaw.

$c$ $c$ are lugs projecting upwardly from the upper or outer end of the eyed portion of the jaw $b$, as clearly seen. The jaw $b$, like the other cast portions of the contrivance, is made of malleable iron, and the lugs $c$ $c$, which are cast in such shape as to permit the placement of the bar $a$ within the eye $i$, are, after the putting together of the parts of the contrivance, slightly bent toward each other, as shown at Fig. 4, so that they will strike against the end flange-like portions $c^2$ $c^2$ of the bar or body $a$, and thus prevent any subsequent accidental removal of the sliding jaw $b$ from the bar $a$, though the former may be easily moved along from end to end of said bar.

The eye $i$ is made somewhat larger than the bar $a$ in the direction of the width of the latter, so that the jaw $b$ may be tipped slightly on the bar $a$, as illustrated at Fig. 2, where it will be seen the upper edge of the eye on one side and the lower edge on the other side come to bearings on the V-shaped opposite edges 1 and 2 of the bar or body $a$. In this manner the eye $i$ is capable of cramping the jaw $b$ on the bar $a$, while at the same time it is perfectly free to easily slide up and down thereon, and when in this cramped position, if the gripe of the eye $i$ on the bar $b$ be increased by pressure against the portion $e$ of the jaw $b$, the latter will be so forcibly cramped as to become immovable.

In the use of the clamp the work or article to be held is placed with one surface in contact with the bearing end $d$ of the screw S, and the sliding jaw $b$ is then slid along on bar $a$ until the part $e$ of the former is brought into contact with the opposite surface of the work, (for instance, as seen at Fig. 2, where B represents the work or article,) and the eye portion $i$ comes into the relative position with the bar shown at Fig. 2. Then by very slightly turning the screw S the cramped jaw $b$ is so forcibly cramped on the bar $a$ that both it and the work confined between its outer end and the end of the cramping-screw will be rigidly held in the relative position shown. By forming the bar $a$ with the V-shaped edges 1 and 2, as seen, and having the eye $i$ adapted to fit around said bar, as shown, this cramping operation is facilitated, and at the same time strength and rigidity in the binding parts are secured. The depressed sides of the bar $a$ lessens the weight without impairing the strength of said bar, and at the same time gives a neat and finished appearance to it, while the portions $c^2$ $c^2$ of the rim-like edge, thus formed on each side of the bar, serve to co-operate with the bent-in lugs $c$ $c$ to effect the retention together of the castings $a$ and $b$ in the manner explained.

Having now so fully explained the construction and operation of my improved clamp that those skilled in the art can make and use the clamps embodying either one or all of the several features of improvement embraced in my said invention, what I claim as new, and desire to secure by Letters Patent, is—

1. The combination of a bar, $a$, having V-shaped opposite edges and depressed sides, with a sliding jaw, $b$, adapted to work thereon in the manner described.

2. In combination with a bar, $a$, having projecting portions $c^2$, a sliding jaw, $b$, formed or provided with lugs $c$, that are capable of being bent toward the bar $a$, and adapted to act in conjunction with the portion $c^2$ to effect the retention together of the parts of the clamp, as set forth.

In witness whereof I have hereunto set my hand this 27th day of July, 1881.

JOHN L. POPE.

In presence of—
R. KOCHLER,
E. C. GHEEN.